United States Patent [19]
Navé et al.

[11] Patent Number: 5,343,549
[45] Date of Patent: Aug. 30, 1994

[54] RISER OPTICAL CABLE HAVING FILLING COMPOUND

[75] Inventors: Samuel D. Navé, Conover; Harvey R. McDowell, III, Hickory, both of N.C.

[73] Assignee: Siecor Corporation, Hickory, N.C.

[21] Appl. No.: 111,753

[22] Filed: Aug. 25, 1993

[51] Int. Cl.$^5$ .............................................. G02B 6/44
[52] U.S. Cl. ................................... 385/103; 385/104; 385/105; 385/106; 385/107; 385/109; 385/110; 385/111; 385/112; 385/113
[58] Field of Search ............... 385/100, 103, 104, 106, 385/107, 109, 110, 111, 112, 113; 523/173

[56] References Cited

U.S. PATENT DOCUMENTS

| | | | |
|---|---|---|---|
| 4,510,348 | 4/1985 | Arroyo et al. | 174/121 A |
| 4,687,294 | 8/1987 | Angeles | 174/121 A X |
| 4,723,831 | 2/1988 | Johnson et al. | 385/109 X |
| 4,786,137 | 11/1988 | Cornelison et al. | 385/113 X |
| 4,892,382 | 1/1990 | Story et al. | 385/113 X |
| 4,902,097 | 2/1990 | Worthington et al. | 385/103 |
| 5,050,957 | 9/1991 | Hamilton et al. | 385/113 X |
| 5,133,034 | 7/1992 | Arroyo et al. | 385/107 |
| 5,148,509 | 9/1992 | Kannabiran | 385/109 |
| 5,247,599 | 9/1993 | Vyas et al. | 385/113 |
| 5,268,983 | 12/1993 | Tatarka et al. | 385/106 |
| 5,291,573 | 3/1994 | Yoshida et al. | 385/103 X |

OTHER PUBLICATIONS

FiberTopics vol. 1, No. 3, Summer 1993, published by SpecTran Corp.

*Primary Examiner*—Brian Healy
*Attorney, Agent, or Firm*—J. David Abernethy

[57] ABSTRACT

Disclosed is a fiber optic cable in which a plurality of buffer tubes each contain optical fibers and a filling compound. The cable outer jacket and the coating on a central member are each made from a flame resistant plastic material. The cable has an NEC listing of OFNR.

6 Claims, 1 Drawing Sheet

RISER OPTICAL CABLE HAVING FILLING COMPOUND

BACKGROUND OF THE INVENTION

1. The Field of the Invention

The field of the invention is optical cables for riser applications.

2. Background of the Invention

The National Electrical Code (NEC) requires that cables to be located within buildings meet higher requirements for smoke and flame resistance than cables to be located outdoors. Among several different possible cable constructions is the "loose tube" construction, in which each buffer tube contains at least one optical fiber and a gel. Since the presence of gel makes it more difficult for a cable to meet the NEC smoke and flame requirements, riser rated cables generally lack such gels. An exception is the cable design as shown in the commonly assigned U.S. Pat. No. 4,892,382, incorporated herein by reference.

Therefore, it is believed that the cable according to the present invention, which utilizes a design markedly different from that disclosed in U.S. Pat. No. 4,892,382, would constitute an advance over the prior art.

SUMMARY OF THE INVENTION

The optical fiber of this invention simultaneously fulfills the requirements of water blocking and flame propagation retardance. The optical fiber cable comprises a central strength member covered by a flame resistant plastic material. Surrounding the central member is at least one layer of buffer tubes each containing a plurality of light waveguides and a filling compound. The cable outer jacket is made of a flame resistant plastic. Optionally, a system comprising a flame resistant tape between layers of aramid yarn may be interposed between the buffer tubes and the outer cable jacket.

BRIEF DESCRIPTION OF THE DRAWINGS

The detailed description of the preferred embodiment refers to the single FIGURE, which is a cross section of the optical fiber cable according to the invention.

DETAILED DESCRIPTION OF THE PREFERRED EMBODIMENT

Figure 1:
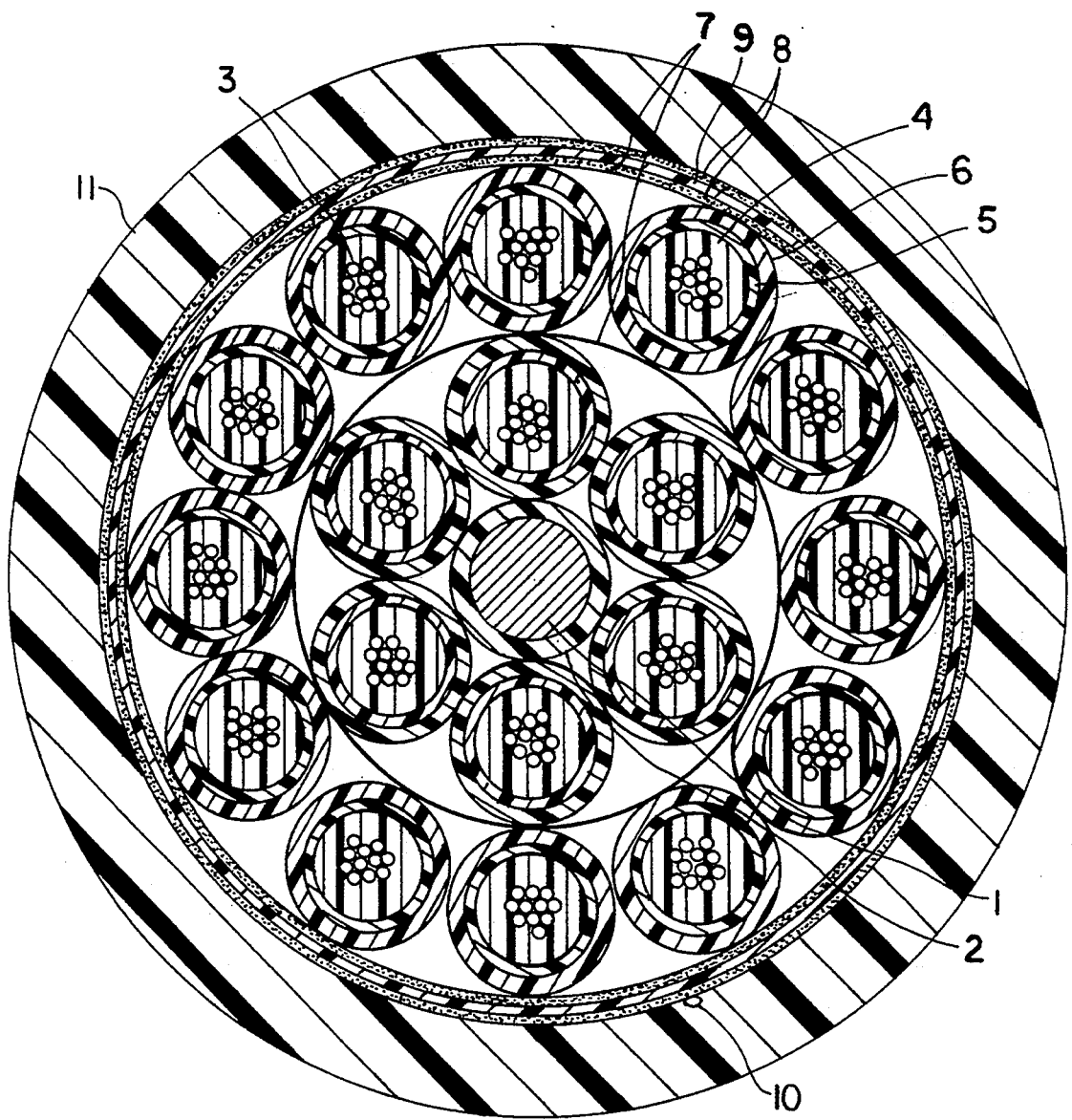

Referring to the FIGURE, a PVC tube 2 is extruded over glass reinforced plastic central member 1. PVC tube 2 may be a smoke suppressed, flame retardant PVC marketed under the name Smoke Guard II 6000 sold by Gary Corporation. In the design of the FIGURE, which has 216 optical fibers, the outer diameter of central member 1 is 2.05 mm and the outer diameter of PVC coating 2 is 3.2 mm.

As shown in the FIGURE, two layers of buffer tubes are stranded with reverse oscillating lay around coated central member 1, 2. A polyester yarn binder 7 is wound about each buffer tube layer. Each buffer tube consists of an outer layer 6 of polybutylterephlate (PBT) 6 over an inner polycarbonate layer 5. Inside each buffer tube 5, 6 are a plurality of light waveguides 3 and filling compound 4, which may preferably be a high molecular weight hydrocarbon based oil. Surrounding the outer layer buffer tubes is another polyester binder thread 7. Laid over the outermost polyester binder layer 7 is a system consisting of a flame resistant polyimide tape 9 between layers 8 of aramid yarns. Tape 9 may be a polyimide, which in the preferred embodiment is a polyimide tape marketed under the name Kapton by Du Pont. Extruded outer flame resistant jacket 11 is preferably made from a polyvinyl chloride, which again is preferably a smoke suppressed, flame retardant PVC product known as Smoke Guard II 6000.

In the 216 fiber cable in the FIGURE, the outer diameter of each buffer tube is preferably 3.0 mm, and outer jacket 11 has an inner diameter of 15.7 mm and an outer diameter of 19.7 mm.

It will be appreciated that the cable according to the invention may contain differing numbers of optical fibers. A version containing 72 optical fibers or less would require only one layer of 6 buffer tubes. If fewer than 36 optical fibers are required, "dummy" tubes may replace buffer tubes.

The cable as described has mechanical specifications of a short term maximum tensile loading (during installation) of 2700N, and a long term tensile loading specification (installed) of 600N. The long term operating temperature specifications are −20 to +70 C. The 216 fiber version has a nominal weight of 350 kg/km, a nominal diameter of 19.6 mm, and a long term installed minimum bend radius of 19.6 cm.

Although the cable according to the invention is possible to be made in a single operation, it is preferable to perform all stranding operations first and to perform jacketing operations subsequently against the possibility of any irregularities which may occur in the stranding process. The Kapton tape 9 is laid on helically with an overlap between each turn. No flooding compound is inserted in the interstices between the buffer tubes.

It will be appreciated by those who are skilled in the art that the FIGURE contains but a single example which is the 216 fiber design; other variations, including designs having as few as 6 optical fibers and a single buffer tube, are within the spirit of the invention.

What is claimed is:

1. A light waveguide cable for riser applications, comprising:
   a central strength member overcoated by a flame resistant plastic;
   at least one layer of buffer tubes stranded around the central member, each buffer tube containing a plurality of light waveguides and a filling compound;
   a flame resistant tape and at least one layer of tensile fibers surrounding the buffer tube layer or layers; and,
   an outer flame resistant jacket.

2. A light waveguide cable as recited in claim 1 containing at least 36 light waveguides.

3. A light waveguide cable as recited in claim 2 containing at least 72 light waveguides.

4. A light waveguide cable for riser applications, comprising:
   a central strength member overcoated by a flame retardant plastic;
   at least one layer of buffer tubes stranded around the central member, each buffer tube containing a plurality of light waveguides and a hydrocarbon oil based filling compound;
   a flame resistant tape and at least one layer of tensile fibers surrounding the buffer tube layer or layers; and,
   an outer flame resistant jacket.

5. A light waveguide cable as recited in claim 4 containing at least 36 light waveguides.

6. A light waveguide cable as recited in claim 5 containing at least 72 light waveguides.

* * * * *